United States Patent [19]

Shilling

[11] Patent Number: 4,521,231

[45] Date of Patent: Jun. 4, 1985

[54] HIGH CAPACITY GAS FILTER SYSTEM

[75] Inventor: Norman Z. Shilling, Lancaster, Pa.

[73] Assignee: General Electric Environmental Services, Inc., Lebanon, Pa.

[21] Appl. No.: 550,694

[22] Filed: Nov. 10, 1983

[51] Int. Cl.³ .............................................. B01D 46/04
[52] U.S. Cl. .................................. 55/302; 55/341 R; 55/385 F
[58] Field of Search ................. 55/302, 304, 319, 324, 55/341 R, 341 MC, 341 PC, 385 F

[56]  References Cited

U.S. PATENT DOCUMENTS

| | | | |
|---|---|---|---|
| 960,564 | 6/1910 | Laughlin | 55/319 |
| 1,757,834 | 5/1930 | Haegler | 55/304 |
| 1,837,836 | 12/1931 | Powell | 55/302 X |
| 1,843,639 | 2/1932 | Hansen | 55/341 |
| 2,035,592 | 3/1936 | Christensen | 55/341 R X |
| 3,057,137 | 10/1962 | Perlis et al. | 55/303 |
| 3,212,237 | 10/1965 | Wright | 55/302 X |
| 3,295,298 | 1/1967 | Mackey | 55/341 R X |
| 3,480,330 | 11/1969 | Hirs et al. | 55/341 |
| 3,648,442 | 3/1972 | Bourne | 55/302 X |
| 3,739,557 | 6/1973 | Anderson et al. | 55/341 |
| 3,856,489 | 12/1974 | Vokral | 55/341 |
| 3,871,845 | 3/1975 | Clarke et al. | 55/341 |
| 3,877,899 | 4/1975 | Bundy et al. | 55/341 |
| 3,898,062 | 8/1975 | Slakey | 55/341 |
| 3,945,400 | 3/1976 | Slakey | 55/302 |
| 3,955,947 | 5/1976 | Hoon et al. | 55/300 |
| 4,113,449 | 9/1978 | Bundy | 55/96 |
| 4,133,659 | 1/1979 | Beckman | 55/314 |
| 4,277,255 | 7/1981 | Apelgren | 55/20 |
| 4,297,115 | 10/1981 | Johnson, Jr. | 55/341 |
| 4,336,035 | 6/1982 | Evenstad et al. | 55/341 |
| 4,343,631 | 8/1982 | Ciliberti | 55/302 |
| 4,360,370 | 11/1982 | McAndrew | 55/302 |

FOREIGN PATENT DOCUMENTS

| | | | |
|---|---|---|---|
| 2058142 | 4/1972 | Fed. Rep. of Germany | 55/302 |
| 2738504 | 3/1979 | Fed. Rep. of Germany | 55/302 |
| 1078802 | 11/1954 | France | 55/324 |

Primary Examiner—Robert Spitzer
Attorney, Agent, or Firm—Ernest F. Chapman

[57]  ABSTRACT

A high capacity gas filter having a particulate collector hopper having a bag housing mounted thereon with the walls of the housing extending outwardly and upwardly from the hopper. The walls terminate in gas passages which may be covered by outwardly extending hoods open at the underside thereof so as to provide for entrance of the dirty air. This opening extends substantially the entire periphery of the housing. A rigid tube sheet having orifices therein extends across the top of the bag housing and rigid frames support bag filters extending downwardly below the orifices and into the housing. A clean air plenum is mounted above the rigid sheet and is connected to a blower for pulling air through the gas passage, downwardly and inwardly along and through the filters and into the clean air plenum. This configuration permits a lower velocity air input and thus provides a higher air-to-cloth ratio while substantially reducing bag deterioration.

13 Claims, 4 Drawing Figures

HIGH CAPACITY GAS FILTER SYSTEM

The present application relates generally to gas filter systems and more particularly to a gas filtering system which simultaneously provide high capacity and high efficiency for removal of particulate from a dirty gas.

The use of industrial air filters utilizing elongate fabric bags are well known in the present art. The standard arrangement provides a bag house containing filter bags which hang downwardly into the bag house and are supported by internal rigid frames. Dirty air is brought into the bag house and distributed so as to pass through the filter bags which collect the particulate on the upstream side of the air flow. The air which exits from the bags is relatively clean and is used for any of a number of purposes. In the normal procedure, air is passed upwardly along the bags and the particulate which is collected on the bags are separated therefrom at intervals by a momentary reverse air flow through the bag wall so that the separated particulate can be collected in a hopper below the bag house and may be periodically removed therefrom.

One of the problems involved in this type of system is the required high air velocity for the input dirty air. If allowed to strike directly on the bags at a high velocity, it will cause the bags to deteriorate in a rapid fashion. Accordingly, various methods have been devised in order to prevent this type of deterioration. Air usually enters the bag house through a duct or the like and baffles are used at or near the air entry port in order to prevent the air from striking the bags and, thus, causing a deterioration. Other systems bring the air in from the top and direct it downwardly to the bottom of the bag house so as to reduce the velocity before it moves upwardly amongst the various filter bags. Examples of the above systems are shown and described in U.S. Pat. No. 4,336,035, issued June 22, 1982, and U.S. Pat. No. 3,871,845, issued Mar. 18, 1975. One of the problems inherent with the concept of moving the air from the lower part of the bag house to the upper part thereof is the reentrainment of the particulate on the bag due to interstitial air flow opposing the natural gravity drop of the particulate. Another problem exists relative to the hopper which collects the particulate in that there is constant air turbulence which tends to disturb the particulate and cause it to rise upward into the bag house.

U.S. Pat. No. 3,480,330, issued Nov. 25, 1969 describes a dust collector which is designed so as to bring the air into the upper part of the bag house and cause it to flow downwardly past the filter bags. Various embodiments are shown and described. In one embodiment, the air enters a space which includes rigid tubes for interconnecting the bags to the fresh air plenum. These tubes are mounted in a tube sheet which has orifices therein allowing the air to be passed downwardly over the filter bags. The inlet dirty air is provided to the space by means of a single conduit. This obviously creates a need for high pressure in order to move a sufficient amount of air satisfactorily. The particulate will be deflected by the interconnecting tubes and distributed in a less than optimal manner. In another modification, it is proposed that shields be used so as to deflect the incoming air downwardly. In the first instance, the plate or the tube sheet with the holes in it is obviously in itself a dust collector and there is no provision for cleaning this area. Additionally, it is well known that the bags must be replaced at intervals and there appears to be no means for conveniently replacing the bags except by dismantling the apparatus and replacing the bags from within the dirty air chamber.

In any of the above systems, it is difficult to maintain a high air to cloth ratio (air volume to filter cloth area).

It is an object of this invention to provide a high capacity gas filter wherein there is provided a reduced velocity input of air and an increase in the air-to-cloth ratio.

A further object of this invention is to provide a high capacity gas filter wherein the air movement of the input dirty air assists in stripping the filtered particles from the filter bags and a general movement of particles and air to promote effective use of all filtering material.

Yet another object of this invention is to provide a high capacity gas filter which does not require any type of shielding, deflectors or the like.

Still another object of this invention is to provide a high capacity gas filter wherein the air within the hopper is substantially quiescent.

Another object of this invention is to reduce the size of the equipment required for filtering a fixed amount of dirty air thus, reducing the costs of the equipment itself.

A still further object of the invention is to eliminate reentrainment of dust on the filter bags due to opposing interstitial air flow.

Another object of this invention is to distribute dust and gas on the bags so that all filter material is used more effectively.

A further object of the invention is to provide a high capacity air filter wherein air enters at the upper interior area of the the enclosure containing the filters, and moves downwardly and inwardly therefrom with the velocity of the air decreasing from the top to the bottom of the filters.

These and other objects of the invention will become apparent from the following description when taken in conjunction with the drawings.

SUMMARY OF THE INVENTION

The present invention provides a high capacity gas filter which comprises a dust collector hopper having a housing mounted thereon with the walls of the housing extending outwardly and upwardly from the dust hopper. The walls terminate in a gas permeable means, such as a screen, in association with a hood, so as to provide a circumferential gas passageway between the exterior and the interior of the housing at the upper end thereof. A tube sheet having a plurality of orifices therein extends across the top of the housing and rigid frames supporting bag filters extend downwardly below the orifice and into the housing. A clean air plenum is mounted above the tube sheet and is connected to a blower for pulling air through the gas permeable opening downwardly along the filters through the filters and into the clean air plenum for subsequent distribution.

The gas permeable means extends around the entire periphery of the upper end of the housing. This configuration permits entry of the dirty gas at a lower velocity than is supplied by a standard duct inlet and, thus, decreases the velocity at which the gas and particulate strike the bags. The movement of the air downwardly past the filters aids in the removal of the particulate from the filter bags so as to allow it to drop into the hopper.

DETAILED DESCRIPTION OF A PREFERRED EMBODIMENT

Before proceeding with the detailed description of the drawings, it is to be understood that they are illustrative only since various components could be changed without departing from the scope of the invention. As an example, the gas filter is shown as a substantially square or rectangular building. However, the number of walls could be varied and the structure could have a different geometrical configuration such as circular or other configurations.

Figure 1:
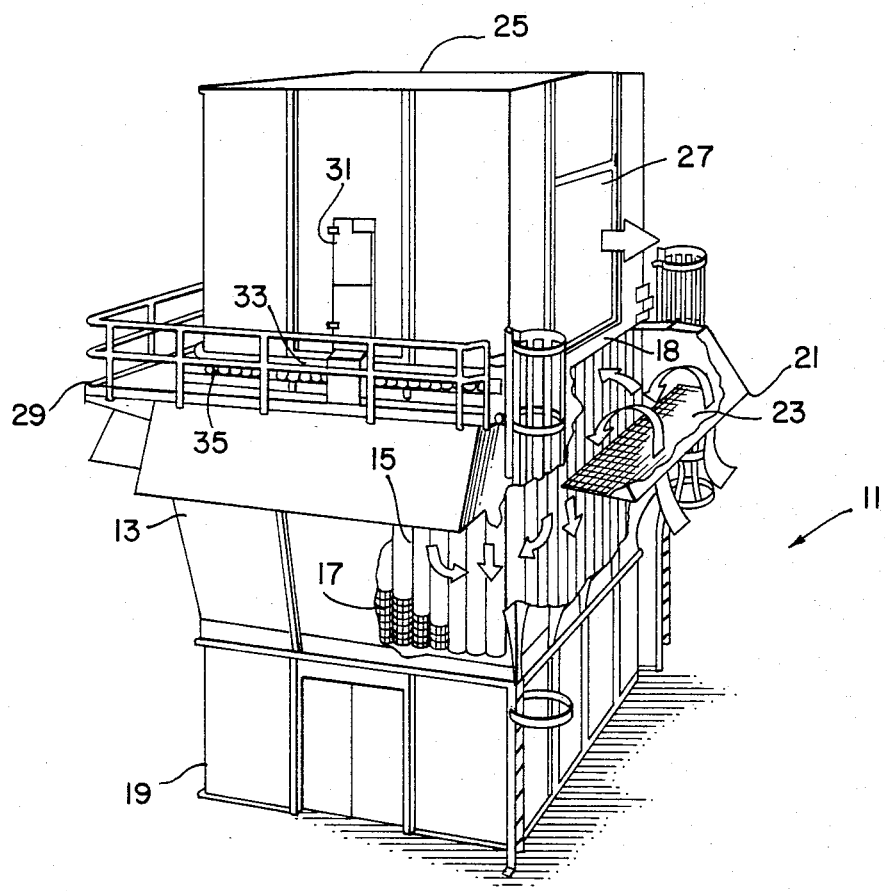
FIG. 1 is a perspective view of one embodiment of a high capacity gas filter using the present invention.

Turning now to FIG. 1, there is shown a perspective view of one embodiment of a gas filter system 11 using the present invention. Under usual conditions, the building would be in an area which generally contains dirty ambient air or gas. One example of such an operation would be in providing clean air to large gas turbines. Under normal circumstances, such operations by nature exist in dirty ambient air. Accordingly, some large type of high capacity air filter is required in order to supply the necessary clean air to the gas turbine.

The high capacity filter of FIG. 1 includes housing 13 with fabric bags 15 therein mounted on rigid frames 17 so as to prevent their collapse. The frames and the bags are secured to a rigid tube sheet 18 which has the necessary orifices for supporting the frames and bags. The distal ends of the bags terminate at the lower end of the housing.

Housing 13 includes upwardly and outwardly extending walls which terminate in air permeable hood 21. Hood 21 interconnects housing 13 and tube sheet 18 so as to provide a gas passageway between the exterior and interior of the housing about its upper perimeter. Screen 23 is provided across the opening in hood 21 in order to prevent debris from being drawn into housing 13.

The illustrated embodiment is appropriate for use in an ambient environment wherein rainfall must not be permitted to reach the bags. With the hood arrangement as shown, such protection is provided. If the filter is to be used in the interior of a building, hood 21 is not necessary. In such an environment, an opening may be provided as shown by dashed lines 24, FIG. 2, and a screen may or may not be necessary depending upon local conditions.

Housing 13 is mounted above hopper 19 so as to direct the gas and air in an inward and downward direction into the bags. Hopper 19 collects the particulate filtered from the dirty air as it drops off the filter bags or is forced from the filter bags. This basic operation is standard in the art relative to gas filter systems.

Clean air plenum 25 is mounted above tube sheet 18 so as to provide a plenum for the developed clean air. Clean air passes out of outlet 27 under the influence of a suction blower or the like. In order to illustrate the size of the apparatus, there is shown an access door 31 adjacent cat walk 29. Also mounted about enclosure 25 are a compressed air header 33 and distributor pipes 35 for providing compressed air to intermittently clean the filter bags as will be discussed in detail as the description proceeds.

Figure 2:
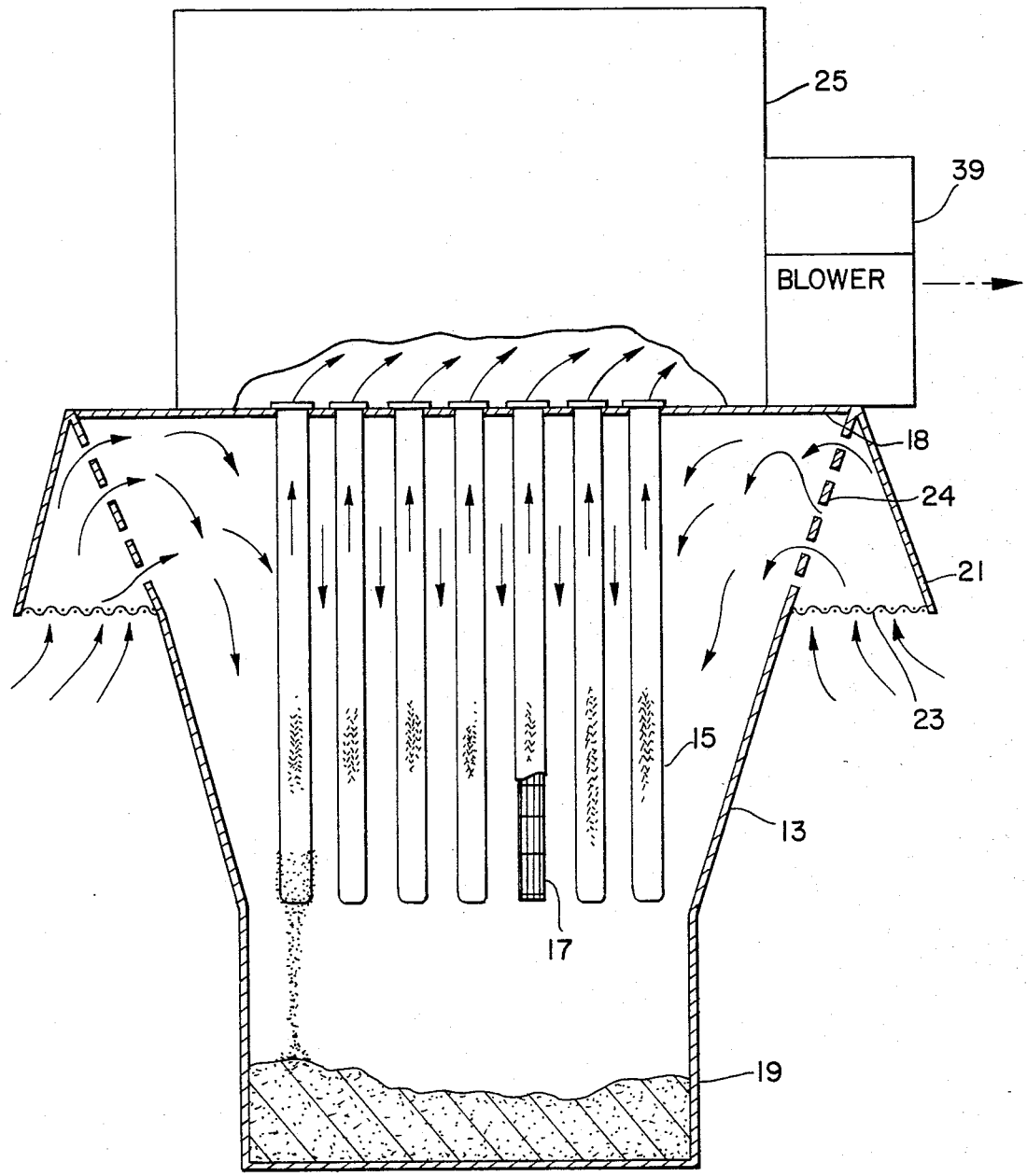
FIG. 2 is a schematic diagram illustrating the gas flow and particulate collection operation of the filter of FIG. 1.

Referring now to FIG. 2, which is a schematic illustration of the apparatus illustrating the air flow path, it will be noted that the gas passes through screen 23 and into housing 13. Since the gas enters the upper part of the housing, it will pass downwardly over filter bags 15 as it is being pulled through the bag material. These bags are preferably made of a polyester fabric which is used generally in the art.

Due to the angular configuration of the walls of housing 13, the entering air diminishes in velocity as it moves downwardly and inwardly past the plurality of bags 15. By the time it reaches the bottom of bags 15, it has substantially attained a zero velocity.

It is obvious that the velocity of the input gas flow is directly related to the size of the input opening, assuming a fixed blower or fan capacity. If the opening extends a substantial distance downwardly relative to bag height, an undesired upward flow of air along the bags will occur resulting in interstitial entrainment of particulate matter. Thus, the size of the opening is limited with a vertical wall, which, in turn, limits the minimum input air velocity. The use of the angled wall allows a larger opening without changing the opening/bag height relationship. This provides the desired lower air velocity without upward interstitial air flow. The size of the opening is preferably chosen so as to maintain an air flow of approximately 1000 fpm.

As will be obvious, the movement of the air downwardly past the bags will assist in removing dirt particulate from the bag so that it may fall into hopper 19. This flow is indicated by the arrows. As opposed to filters which pass the air upwardly along the filter bags, the present invention eliminates reentrainment of particulate caused by opposing interstitial air flow since, in the present invention, the air flow is in a downward and inward direction.

The illustrated configuration, with the entrance of the dirty air into the upper part of housing 13, together with, the outwardly angled walls, permits air to be pulled into the housing about the entire upper periphery thereof at a lower velocity than can be obtained through any of the known filter arrangements which use a conduit air input at a single point in the bag house. Since the air is brought in at a lower velocity, there is substantially no possibility of deterioration of the bags over a reasonable period of time. In the known systems, it is necessary to provide baffles or some air restrictive means in order to prevent such damage to the bags.

FIG. 2 schematically indicates suction blower 39 which provides for the movement of the air as shown by the arrows into the upper area of housing 13, downwardly along and through bags 15 outwardly into the clean air plenum and ultimately to the device or area which requires the clean air.

Figure 3:
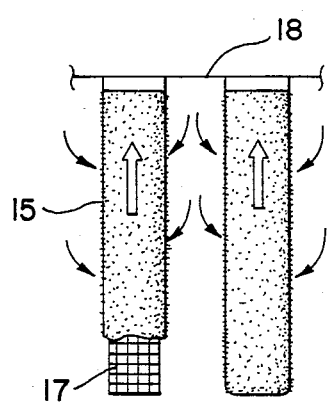
FIG. 3 is a schematic illustration of the air movement as the filter bags are filtering the dirty gas.

FIG. 3 is a partial schematic showing filter bags 15 including a breakaway section showing rigid support 17 and indicating the air flow to and through the bags and the accumulation of dirt particles thereon.

Figure 4:
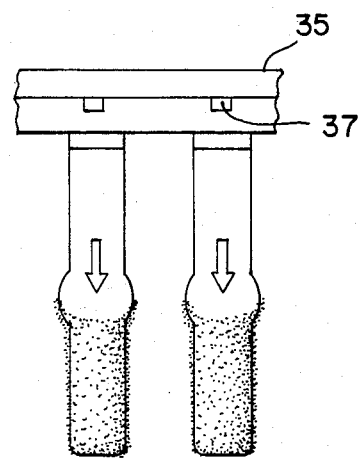
FIG. 4 is a schematic illustration of the intermittent use of pulse air jets to clean the exterior of the filter bags.

Even though the movement of the air downwardly through the present system aids in removing the dirt particles from the bags, it is necessary to provide a means for intermittently cleaning the bags. Such a system is illustrated in FIG. 4 which shows distributor pipe 35 having nozzles 37 above the bag structure. As is well known in the art, air pulses under pressure from a compressed air source may be supplied for a very short time. These pulses result in the action shown in FIG. 4 wherein they move downwardly along the filter bags and, thus, force the dirt from the bags. Again, since there is no interstitial counter air flow, the particulate matter moves directly downwardly and into the hopper.

It should be noted that the bags and their rigid support frames are accessible from the clean air plenum. This provides access within the clean air plenum for easy removal and repair or replacement. Bag cages can be removed in the clean air plenum, used bags dropped and new bags replaced without bringing dirty bags into the clean air plenum.

As will now be obvious, the present invention provides a complete circumferential entry of dirty gas flow around the filtering bag pattern. Further, this gas enters near the top of the bag housing having an outwardly angled wall so as to provide a lower flow velocity entering the bag pattern which decreases from top to bottom. This system provides low interstitial velocity and low fabric abrasion from particles entering the bag pattern and eliminates the need for the shielding of the bags. Additionally, the gas flow is directed downwardly and inwardly so that it aids removal of particulate falling from the bags and down into the hopper. Since the velocity of the gas is substantially zero at the bottom of the bags, a quiescent hopper exists so as to prevent dust reentrainment and permit a gentle settling out of fines.

As previously stated, the above description and drawings are illustrative only since component sizes and configurations could be changed without departing from the invention, the scope of which is to be limited only by the following claims.

I claim:

1. A high capacity gas filter comprising
  a particulate collector hopper;
  a housing mounted on said hopper and communicating therewith, said housing comprising
    wall means extending outwardly and upwardly from said hopper;
  a rigid sheet having a plurality of orifices therein;
  gas permeable means interconnecting the upper edges of said wall means about the perimeter of said rigid sheet so as to provide a circumferential gas passage;
  a plurality of frames supported by said rigid sheet and extending downwardly from said orifices and into said housing;
  a filter bag surrounding each of said frames, the filter bag extending through the housing and terminating at the lower end of the housing;
  a clean air plenum mounted above said rigid sheet; and
  means for causing gas to pass into said housing through said circumferential gas passage, downwardly and inwardly along said filter bags, through said filter bags and into said plenum without the use of baffles.

2. The filter of claim 1 wherein the distal ends of said filter bags terminate substantially at the lower end of said housing.

3. The filter of claim 1 wherein said gas permeable means comprises
  an open circumferential gas passage.

4. The filter of claim 3 further comprising a debris screen mounted across said passage.

5. The filter of claim 1 wherein said filter bags are of a fabric material.

6. The filter of claim 1 further comprising means for intermittently applying pulses of air through said orifices into the interior of said filter bags.

7. The filter of claim 1 wherein all of said filter bags are mounted above said hopper.

8. The filter of claim 1 wherein said frames are removable and said bags are replaceable.

9. A high capacity gas filter comprising
  a particulate collector hopper;
  a housing having outwardly extending walls mounted on said hopper;
  an open hood mounted on said walls about the upper perimeter of said housing so as to provide a circumferential gas passage between the exterior and interior of said housing;
  a tube sheet having a plurality of orifices therein mounted on top of said hood so as to cover said housing;
  a plurality of frame supported elongated filter bags extending downwardly into said housing from each of said orifices, said filter bags terminating at the lower end of the housing;
  a clean air plenum mounted above said rigid sheet; and
  means for causing gas to pass through said circumferential passage into the upper area of said housing, downwardly and inwardly along and through said filter bags and into said plenum without the use of baffles.

10. The filter of claim 9 further comprising
  a debris screen mounted across said open hood.

11. The filter of claim 9 wherein the distal ends of said filter bags terminate substantially at the lower end of said housing.

12. The filter of claim 9 wherein said filter bags are of a fabric material.

13. The filter of claim 9 further comprising
  means for intermittently applying pulses of air through said orifices into the interior of said bags.

* * * * *